(12) United States Patent
Roe

(10) Patent No.: US 12,553,872 B2
(45) Date of Patent: *Feb. 17, 2026

(54) COLORIMETRIC QUANTIFICATION OF CORROSION INHIBITOR COMPOUNDS IN INDUSTRIAL FLUIDS

(71) Applicant: NORTHERN TECHNOLOGIES INTERNATIONAL CORPORATION, Circle Pines, MN (US)

(72) Inventor: Mikel Robert Roe, Lino Lakes, MN (US)

( * ) Notice: Subject to any disclaimer, the term of this patent is extended or adjusted under 35 U.S.C. 154(b) by 817 days.

This patent is subject to a terminal disclaimer.

(21) Appl. No.: 17/792,294

(22) PCT Filed: Apr. 16, 2021

(86) PCT No.: PCT/US2021/027580
§ 371 (c)(1),
(2) Date: Jul. 12, 2022

(87) PCT Pub. No.: WO2022/098389
PCT Pub. Date: May 12, 2022

(65) Prior Publication Data
US 2023/0060503 A1    Mar. 2, 2023

Related U.S. Application Data

(60) Provisional application No. 63/110,533, filed on Nov. 6, 2020.

(51) Int. Cl.
G01N 21/64 (2006.01)
C07F 5/02 (2006.01)
C09B 57/00 (2006.01)
C09K 11/06 (2006.01)
G01N 15/10 (2024.01)
(Continued)

(52) U.S. Cl.
CPC .................................. *G01N 31/22* (2013.01)

(58) Field of Classification Search
CPC ............................. G01N 31/22; C23F 11/10
See application file for complete search history.

(56) References Cited

U.S. PATENT DOCUMENTS 4,966,711 A    10/1990 Hoots et al.
5,272,346 A    12/1993 Kaplan et al.
(Continued)

FOREIGN PATENT DOCUMENTS

CN    105067612 B    3/2018
JP    60211364 A  * 10/1985  ............. G01N 31/22

OTHER PUBLICATIONS

Chemical Company (See Attached Document) https://thechemco.com/chemical/copper-sulfate/ (Year: 2018).*

*Primary Examiner* — Jennifer Wecker
*Assistant Examiner* — Oyeleye Alexander Alabi
(74) *Attorney, Agent, or Firm* — Hudak, Shunk & Farine Co. LPA

(57) ABSTRACT

A composition for the colorimetric quantification of corrosion inhibiting compounds in an industrial fluid, including an analytic reagent composition comprised of a non-aqueous transition metal-ligand solution mixed with a corrosion inhibitor containing fluid, where the combination produces a color change that quantifies the amount of the corrosion inhibitor in the fluid.

20 Claims, 14 Drawing Sheets

(51) Int. Cl.
*G01N 15/1429* (2024.01)
*G01N 31/22* (2006.01)
*G01N 33/483* (2006.01)
*G01N 33/68* (2006.01)

(56) References Cited

U.S. PATENT DOCUMENTS

| | | |
|---|---|---|
| 5,744,365 A | 4/1998 | Pellet et al. |
| 6,358,747 B1 * | 3/2002 | Condit .................. G01N 21/78 436/83 |
| 8,470,532 B2 | 6/2013 | Lu et al. |
| 2009/0298190 A1 * | 12/2009 | Pellet .................... G01N 31/22 436/164 |
| 2016/0312262 A1 | 10/2016 | Lee et al. |
| 2017/0356093 A1 | 12/2017 | Kalakodimi et al. |
| 2020/0347718 A1 | 11/2020 | Murugesan et al. |

\* cited by examiner

COLORIMETRIC QUANTIFICATION OF CORROSION INHIBITOR COMPOUNDS IN INDUSTRIAL FLUIDS

FIELD OF THE INVENTION

Corrosion of ferrous and yellow metals such as iron, copper, and related alloys remain a pervasive problem throughout the supply chain for various and widespread industries. The economic consequences associated with this deterioration in material integrity are significant, with annual costs estimated at 4% of the gross domestic product (GDP) in the USA alone. Efforts to slow the rate of this thermodynamically favored process have included a multitude of measures, including the addition of corrosion inhibitor chemistries to industrial fluids and packaging materials that are used in the manufacture, operation, and preservation of metal parts. To date, measuring the concentration of said inhibitors in these fluids has relied primarily on either expensive analytical instruments, or non-specific techniques highly susceptible to interference. An alternative to these approaches, the current invention describes an analytical reagent comprising a transition-metal ligand in a non-aqueous solution that reacts quantitatively with inorganic and organic corrosion inhibitors to form colored products The few commercially available analytical reagents that utilize transition metal chemistry are not designed for measuring corrosion inhibitors. For example, solutions comprised of copper salts have been used for quantifying protein concentration in aqueous environments. The light blue color produced is based upon the "biuret reaction" and requires a minimum of 3 or more peptide bonds.

Additionally, products designed to quantify transition metal ions such as $Cu^{2+}$ in aqueous environments are ubiquitous in the commercial world. These products in effect are the opposite of the proposed invention as they use metal-reactive chemistries to bind available metal ions.

Similarly, various reagents are available that enable the detection of chromatographically resolved transition metal ions via UV-vis spectrophotometry. These so-called post-column derivatization reagents are comprised of compounds with strong affinity for transition metal ions. As such, they too are conceptually the reverse of the proposed invention.

SUMMARY OF THE INVENTION

The present invention relates to an analytical reagent comprised of solvent-born transition metal ligand compounds that change color quantitatively (light absorbance value) when combined with fluids containing corrosion inhibitors. The absorbance value can be measured using a spectrophotometer wherein the so-called "absorbance value" is a unit-less number typically ranging from 0 to 3. In short, it is the amount of photons from an incident light source that is absorbed by a fluid.

A composition for the colorimetric quantification of corrosion inhibiting compounds in an industrial fluid, comprising an analytic reagent composition comprising a transition metal-ligand solution that when mixed with a corrosion inhibitor containing fluid, results in said mixed analytical reagent solution having an absorbance value that quantifies the amount of said corrosion inhibitor in said fluid.

A process for the detection of an amount of corrosion inhibitor in a fluid utilizing a wavelength analyzer, comprising determining the optimal wavelength between 200 and 900 nanometers for measuring corrosion inhibitor-dependent absorbance changes to an analytical reagent by analyzing the absorbance spectra of said analytical reagent solution in the absence or presence of a corrosion inhibitor fluid (that is, the absorbance value is relatively the same with or without the fluid); setting said wavelength analyzer to the determined optimal wavelength; analyzing said analytical reagent solution in the absence of corrosion inhibitor (Control) at said optimal wavelength; setting the absorbance value of said Control analytical reagent solution at said optimal wavelength on said wavelength analyzer to zero; combining said analytical reagent solution with a known amount of a solution comprising said corrosion inhibitor to form a "Standard" analytical reagent-corrosion inhibitor solution; determining the absorption value of said "Standard" analytical reagent-corrosion inhibitor solution at said optimal wavelength; analyzing the absorption value of a further different solution ("Test" sample) comprising said analytical reagent with a fluid containing an unknown amount of the same type of said corrosion inhibitor, and comparing the absorption value of said further solution containing said unknown amount of said corrosion inhibitor with the absorption value of said "Standard" solution having a known amount of corrosion inhibitor therein, and wherein the amount of said unknown corrosion inhibitor in said further analytical reagent solution is the percent of the absorption value of said unknown further corrosion inhibitor solution as compared to the absorption value of said "Standard" solution having said known amount of corrosion inhibitor therein multiplied by the amount of corrosion inhibitor in said "Standard" transition metal-ligand inhibitor solution.

A process for the detection of an amount of a corrosion inhibitor in a fluid utilizing a wavelength analyzer; comprising determining the optimal wavelength between 200 and 900 nanometers for measuring corrosion inhibitor-dependent absorbance changes to an analytical reagent by analyzing the absorbance spectra of said analytical reagent solution in the absence or presence of a corrosion inhibitor fluid (i.e. the absorbance value with or without the fluid is relatively the same); setting said wavelength analyzer to the determined optimal wavelength; analyzing said analytical reagent solution in the absence of corrosion inhibitor (Control sample) at said optimal wavelength; setting the absorbance value of said Control analytical reagent solution at said optimal wavelength on said wavelength analyzer to zero; combining said analytical reagent solution with a known amount of a solution comprising said corrosion inhibitor to form a "Standard" analytical reagent-corrosion inhibitor solution; determining an absorption value of said "Standard" analytical reagent-corrosion inhibitor solution at said optimal wavelength, and placing said absorbance value at a point on a plot of an absorption value (vertical axis) versus the weight percent of said corrosion inhibitor (horizontal axis) in said fluid; drawing essentially a straight line from said absorbance value point of said "Standard" analytical reagent-corrosion inhibitor solution on said plot to the origin at 0 absorbance and 0% corrosion inhibitor on said plot; analyzing the absorption value of a further different solution ("Test" sample) comprising said analytical reagent with a fluid containing an unknown amount of the same type of said corrosion inhibitor, and placing the absorbance value thereof as a point on said line of said plot; and wherein the value directly vertically below said absorbance value of said further solution on said straight line is the amount of corrosion inhibitor in said further different solution.

BRIEF DESCRIPTION OF THE DRAWINGS

FIG. 8 shows how this can be done by comparing the broad-range absorbance spectra for transition-metal/inhibitor complexes formed by reacting the analytical reagent with increasing concentrations of the test fluid. In this analysis of a fatty imidazoline corrosion inhibitor solution, the optimal wavelength (x-axis) is visually determined as the wavelength where the greatest change in absorbance (y-axis) occurs in response to changes in corrosion inhibitor concentration (700 nm in FIG. 8). Step 2) Measure the absorbance of the "Control" solution at the optimal wavelength in step 1, as shown in FIG. 9A. The "Control" solution does not contain the corrosion inhibitor of interest and is typically the analytical reagent either alone, or combined with a solvent similar to the test fluid that contains 0% corrosion inhibitor. Step 3) With the "Control" solution still in the spectrophotometer, "Zero" or "Tare" the instrument so that the initial measured absorbance of the "Control" solution becomes the reference point for all subsequent measurements, as shown in FIG. 9B. Step 4) At the optimal wavelength determined in step 1, measure the absorbance of the analytical reagent combined with a "Standard" solution containing a known concentration of the corrosion inhibitor fluid at the optimal wavelength. FIG. 9C shows this reaction for a 10% solution of the fatty imidazoline corrosion inhibitor where the resulting analytical reagent/corrosion inhibitor complex produced an absorbance of 1.00. Step 5) At the optimal wavelength determined in step 1, measure the absorbance of the analytical reagent combined with a "Test" fluid of interest containing an unknown amount of the same corrosion inhibitor present in the "Standard" solution measured in step 4. FIG. 9D shows this reaction for a representative "Test" fluid containing the fatty imidazoline corrosion inhibitor where the resulting mixture produced and absorbance of 0.75. Step 6A) Calculate the corrosion inhibitor concentration in the "Test" fluid via proportional analysis, as described in FIG. 10. By equating the absorbance/concentration ratio of the "Standard" solution to that of the "Test" solution the previously unknown corrosion inhibitor concentration of the "Test" solution is readily determined. For the fatty imidazoline solutions described in steps 4 and 5 above, this analysis returns a value of 7.5% as shown in FIG. 10. Step 6B) Alternatively, the corrosion inhibitor concentration in the "Test" fluid can be calculated via linear regression analysis. As shown in FIG. 11, this approach involves plotting the data for the "Control" and "Standard" solutions from steps 3 and 4 above on an absorbance vs. corrosion inhibitor concentration graph. A straight line connecting the data points is then drawn and the equation for that line determined, where the absorbance of a sample (y) is related to the corrosion inhibitor concentration (x) via the response factor (slope of the line). For the "Control" and "Standard" solutions in the fatty imidazoline analysis this generated a line with the equation y=0.1x. To calculate the previously unknown corrosion inhibitor concentration of the "Test" solution, substitute its measured absorbance from step 5 into the defined equation and solve for x. For the fatty imidazoline analysis described in FIG. 12 this approach also yields a value of 7.5%.

DETAILED DESCRIPTION OF THE INVENTION

Figure 1A:
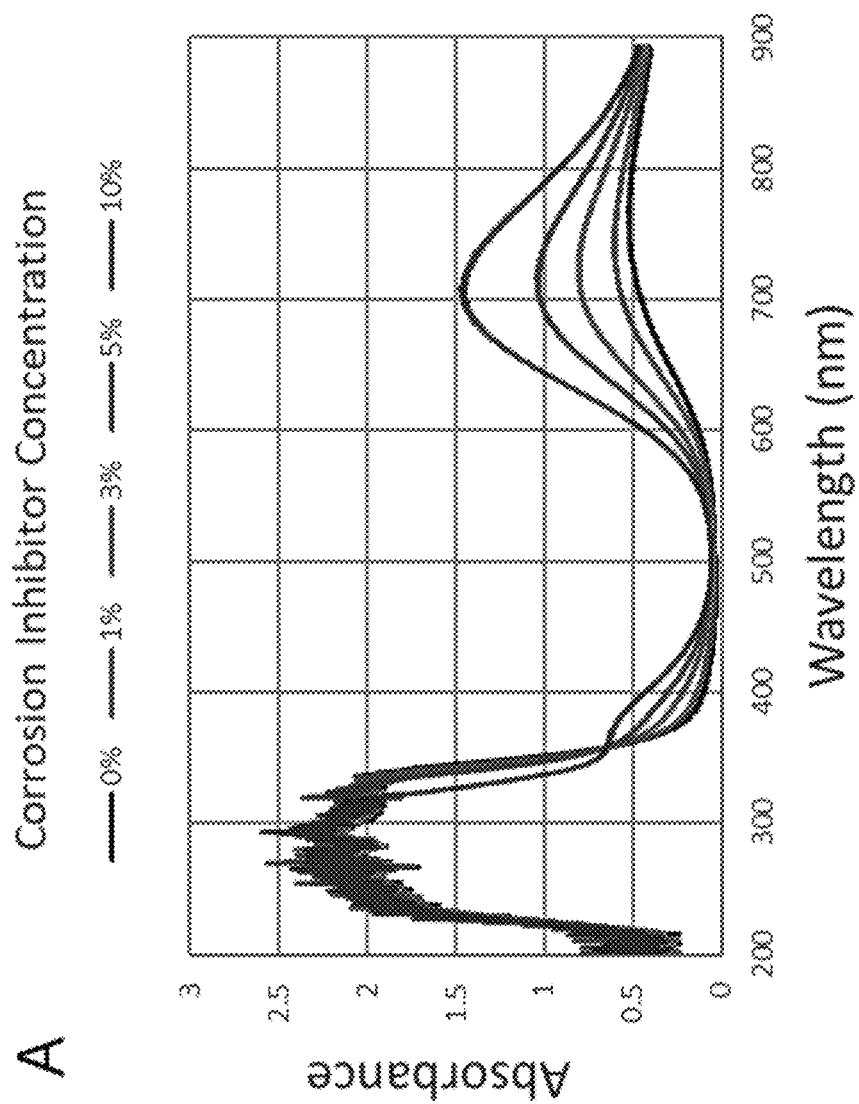
FIG. 1A shows an overlay of the raw UV-vis spectra for the reaction products formed after combining the analytical reagent with standard solutions that contain increasing concentrations of a representative alkyl imidazoline corrosion inhibitor compound.

Corrosion protection with regard to various metals and other items is a necessity to permit the proper functioning as well as longevity of various metal items such as parts, machines, vehicles and other articles from deteriorating. Corrosion inhibitors are used in many different fields including petrochemical, water treatment, aerospace, automotive, marine, and building construction.

The present invention relates to determining whether a suitable or proper amount of one or more corrosion inhibitors are contained within a fluid. Examples of fluids include rust preventatives, metal cleaners, cutting fluids, engine oils, hydraulic fluids, antifreeze, and surface coatings such as paint, primers, etc. It also relates to fluids generated via liquid extraction of solid materials containing corrosion inhibition chemistries. Such materials include extruded, die cast, and injection molded plastic materials such as polyolefin products, film, packaging and shaped products, as well as paper, cardboard, scrim, and other cellulose based materials.

The analytical reagent solutions of the present invention generally comprise a transition metal containing one or more ligands that are located in a solvent. Desirable transition metals include one or more of iron, cobalt, and copper. While various different ligands can be utilized, preferred ligands include sulfates, such as $SO_4$, and one or more chlorine atoms or molecules, i.e. $Cl$, $Cl_2$ and $Cl_3$. Specific examples of desired transition metal-ligand compounds comprise one or more of $CuSO_4$, $CuCl$, $CuCl_2$, $CoSO_4$, $CoCl_2$, $CoCl_3$, $FeSO_4$, $FeCl_2$, or $FeCl_3$, or any hydrates, and/or any combination thereof. The present invention is free of other metals meaning that it has less than about 5 wt. %, desirably less than about 3 wt. %, and preferably nil, that is no other metals therein based upon the total weight of the analytical reagent solution.

Critical to their utility for measuring corrosion inhibitor concentration in fluids, the above noted transition metalligands dissolved in non-aqueous solutions react quantitatively with various classes of organic and inorganic corrosion inhibitors comprising one or more of the heteroatoms of nitrogen, oxygen, sulfur, and phosphorous. Examples of heteroatomic functional groups that react with the above metal-ligands, together with representative corrosion inhibitor compounds are listed in Table 1. They include, and are not limited to, one or more amines, nitrites, carbonates, carboxylates, aminopolycarboxylates, thiazoles, thiadiazoles, phosphates, or 1,3-diketones, or any combination thereof.

TABLE 1

Applicable Range of Chemical Classes of Corrosion Inhibitors

| Chemical Class | Example (broad) | Example (specific) |
| --- | --- | --- |
| Amines | Primary, secondary, tertiary, quaternary amines, fatty amines | Triethylamine, dicyclohexylamine, pyridine, morpholine |
| Azoles | Triazoles, thiazoles, imidazoles, imidazoline | Benzotriazole, mecaptobenzothiazole, |
| Nitrite | Alkali metal salts, amine salts | Sodium nitrite, dicyclohexylamine nitrite |
| Carbonates | Alkali metal and alkali earth metal salts, bicarbonates | Sodium carbonate, calcium carbonate, sodium bicarbonate |
| Carboxylates | Benzoates, fatty acid salts, amine salts, aminopolycarboxylates | Sodium salicylate, sodium ethylhexanoate, cicyclohexylamine benzoate, sodium methylglycinediacetate |
| Phosphates | Alkali metal and alkali earth metal salts, phosphate esters | Potassium phosphate, ethanol,2-(2-butoxyethoxy)-phosphate, mono-n-octyl phosphate ester |
| 1,3-diketones | | Acetylacetone |

Figure 1B:
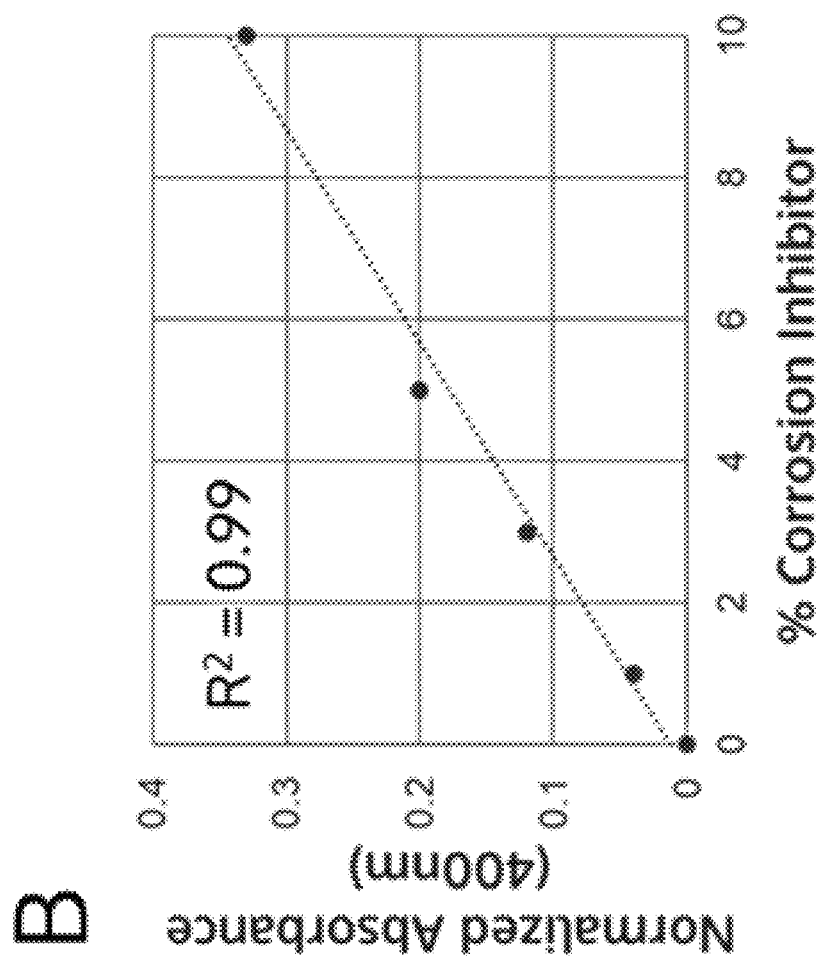
FIG. 1B shows the linear quantitative response between the amount of light absorbed at 400 nm and the concentration of corrosion inhibitor reacted with the analytical reagent. The linearity of the response for each compound is reflected by the coefficient of determination ($R^2$) value where 1.00 is ideal. Specifically, this value expresses the proportion of variance in the absorbance value that is predictable by the concentration of the corrosion inhibitor. Moreover, the "optimal wavelength" for measuring each transition-metal ligand/corrosion inhibitor colored complex is listed in each relevant figure for each compound.
Figure 1C:
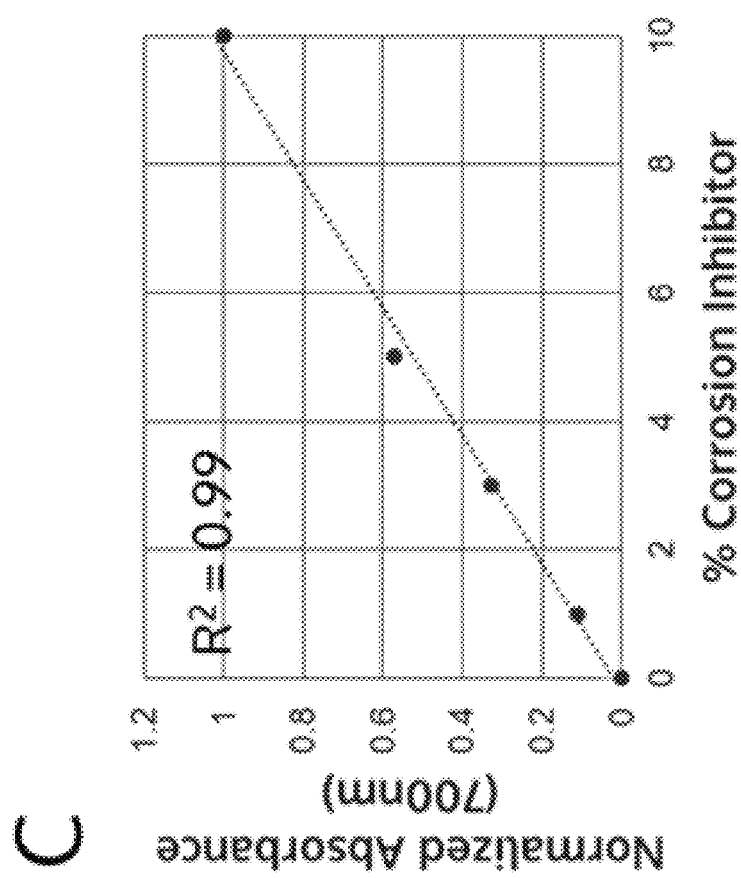
FIG. 1C shows the linear quantitative response between the amount of light absorbed at 700 nm and the concentration of corrosion inhibitor reacted with the analytical reagent. The linearity of the response for each compound is reflected by the coefficient of determination ($R^2$) value where 1.00 is ideal.

To demonstrate the quantitative response of the analytical reagents described above to these various classes of corrosion inhibitors, the preferred reagent formulation, comprising $CuSO_4$ as the transition metal-ligand, was mixed with standard solutions of compounds representative of each class. The resulting mixtures were subsequently analyzed spectrophotometrically for their absorbance of visible light at predetermined optimal wavelengths. The linear relationship between the amount of light absorbed and the concentration of each representative compound in the reaction was assessed via linear regression analysis, where the value of the resulting correlation dependent ($R^2$) for the best fit line of the data served as the metric for linearity. An example of this analysis is provided in FIGS. 1A-C, where solutions of a representative alkyl imidazoline corrosion inhibitor ranging in concentration from 1%-10% were combined with the preferred embodiment of the analytical reagent. The absorbance spectra spanning from 200-900 nm were collected for each mixture and then over-layed for ease of comparison (FIG. 1A). The visually apparent correlation between imidazoline concentration and the amount of absorbed light at 400 nm and 700 nm was confirmed via linear regression analysis, as shown by the high correlation determinant (0.99 on scale from 0-1) calculated for each wavelength (FIGS. 1B and 1C, respectively).

Figure 2:
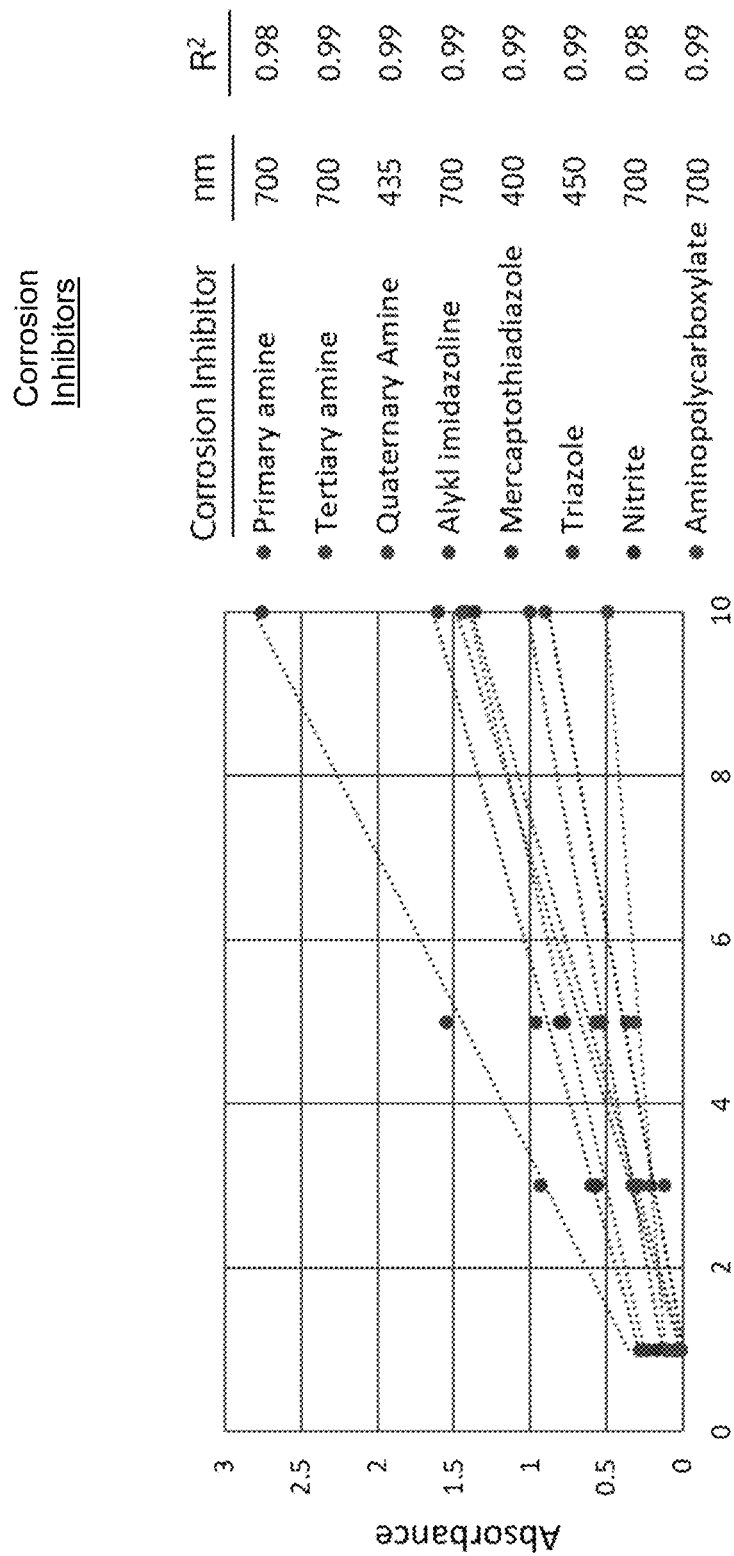
FIG. 2A shows a quantitative response, light absorption, of various nitrogen containing corrosion inhibitors per se in standard solutions after reaction with the transition metal-ligand reagent (preferred formula, that is copper sulfate pentahydrate) UV-vis absorbance measurements (200-1100 nm) were collected at optimal wavelengths for each compound as listed in the figure (nm). The linearity of the response for each compound is reflected by the coefficient of determination ($R^2$) value where 1.00 is ideal. (see section 10 above for expanded description)

The same analytical reagent shows a similar linear response to various types of amines useful for mitigating corrosion. These reactive amines range from about 1 to about 20 carbon atoms, and desirably have from 3 to 15 carbon atoms and preferably from about 5 to about 12 carbon atoms, and include saturated and unsaturated primary, secondary, tertiary, and quaternary amine compounds in both alkyl and cyclo configurations. For example, mixing the analytical reagent in its preferred embodiment with standard solutions of representative primary, tertiary, and quaternary amine compounds generated product solutions that absorbed select wavelengths of light in a manner linearly dependent ($R^2 \geq 0.98$) on amine concentration (FIG. 2). Additional examples of such reactive compounds include octylamine (primary), dicyclohexylamine (secondary), triethanolamine (tertiary), stearylamine (saturated), oleylamine (monounsaturated), linoleamine (diunsaturated), and the like.

FIG. 2 also demonstrates the linear response of the analytical reagent in its preferred embodiment to various representative heterocyclic compounds. These include compounds containing only nitrogen (imidazoline, triazole) in the ring structure, as well as one mixed-type heterocycle where both nitrogen and sulfur are present (mercaptothiadiazole). Additional heterocyclic compounds, containing 1 to about 4 heteroatoms and 1 to about 6 ring structures, each comprised of 5 or 6 atoms having various degrees of saturation, are also reactive. Among the nitrogen-only heterocycles various compound classes such as pyroles, pyridines, and di-, tri-, and tetra-azoles to name a few, are included. Desired examples include pyridine, benzimidazole, and benzotriazole. The mixed-type heterocycles combine nitrogen and at least one other heteroatom in the same ring structure, including such classes as oxazines, thiazoles, and thiadiazoles, among others. Desired examples include morpholine, mercaptobenzothiazole, and dimercaptothiadiazole.

In addition to the aforementioned compound classes, both inorganic and organic nitrite salts also react quantitatively with the preferred embodiment of the analytical reagent to form colored complexes. FIG. 2 illustrates this linear response for a representative nitrite salt (sodium nitrite) where solutions of increasing nitrite concentration combine with the analytical reagent to generate product solutions that absorb light at 700 nm in a concentration-dependent manner ($R^2$=0.98). This reactivity is also found for similar compounds including various alkali metal and alkaline earth metal nitrite salts such as potassium nitrite, magnesium nitrite and calcium nitrite. Additional inorganic nitrite salts such as ammonium nitrite are also included. Similarly, various organic nitrite salts comprised of alkyl, cyclo, and heterocyclic amine cations as described above also react with the preferred embodiment of the analytical reagent to form colored solutions. These amine cations can range from about 1 to about 20 carbons and desirably from about 3 to about 15 carbon atoms, and preferably from about 5 to about 12 carbon atoms. Desired examples include triethanolamine nitrite, dicyclohexylamine nitrite and morpholine nitrite.

Still another class of nitrogen-containing compounds that react readily with the preferred embodiment of the analytical reagent are the aminopolycarboxylates. Ranging from about 2 to 30 carbons and desirably from about 4 to about 20 carbon atoms and preferably from about 6 to about 15 carbon atoms and commonly salted with alkali metals and/or alkaline earth metals, these well-known metal chelators include compounds such as disodium ethylenediaminetetraacetic acid (EDTA), calcium disodium EDTA, tetrasodium EDTA, dipotassium EDTA, trisodium methylglycinediacetic acid (MGDA), tetrasodium glutamate diacetate (GLDA), pentasodium diethylenetriaminepentaacetate (DTPA), trisodium nitrilotriacetate (NTA), trisodium ethylenediaminedisuccinate (EDDS), and tetrasodium iminodisuccinate (IDS) among others. The quantitative response of the analytical reagent to solutions of aminopolycarboxylates is demonstrated in FIG. 2 where mixtures of the reagent with MGDA absorbed light at 700 nm in a concentration-dependent manner ($R^2$=0.99).

Figure 3:
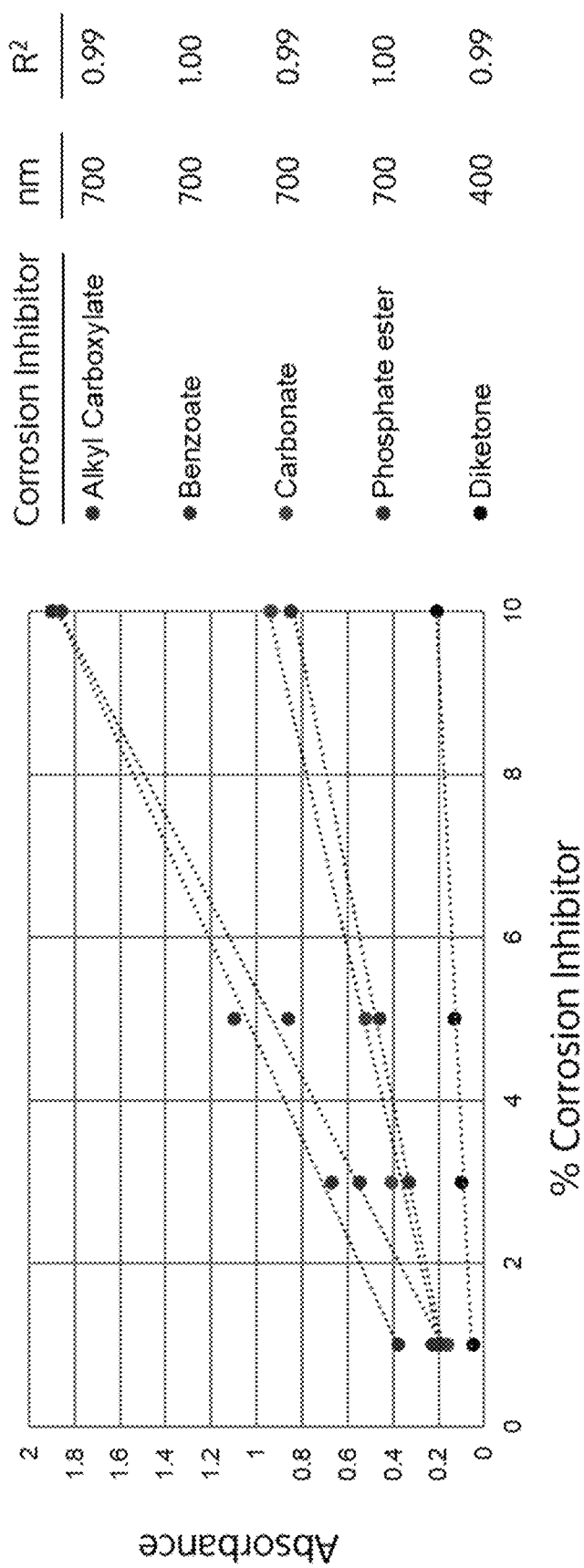
FIG. 3 shows a quantitative response, light absorption, of various additional corrosion inhibitor classes per se in standard solutions after reaction with the transition metal-ligand reagent (preferred formula). UV-vis absorbance measurements (200-1100 nm) were collected at optimal wavelengths for each compound as listed in the figure (nm). The linearity of the response for each compound is reflected by the coefficient of determination ($R^2$) value where 1.00 is ideal.

As with nitrite, various alkali metal and alkali-earth metal salts of carbonate and bicarbonate (singly protonated form) also quantitatively form colored complexes with the preferred embodiment of the analytical reagent. This is shown in FIG. 3 where mixtures of the preferred analytical reagent and solutions of sodium carbonate absorbed 700 nm light in a manner dependent on carbonate concentration ($R^2$=0.99). Additional desired examples from this class of reactive salts include potassium carbonate, calcium carbonate, magnesium carbonate, sodium bicarbonate and potassium bicarbonate. Also, the carbonate and bicarbonate salts of ammonium, as well as those comprised of the various amines described above ranging from about 1 to 20 carbons and desirably from about 3 to about 15 carbon atoms, and preferably from about 5 to about 12 carbon atoms, such as cyclohexylamine carbonate, are also included.

Various alkyl, cyclo, and aromatic carboxylate salts ranging from about 1 to 30 carbons and desirably from about 3 to about 20 carbon atoms, and preferably from about 5 to about 15 carbon atoms and containing 1 or more carboxylate groups also react quantitatively with the preferred embodiment of the analytical reagent. These include both alkali metal and alkaline earth metal salts, most notably sodium octanoate, potassium benzoate, magnesium salicylate, as well as the salts of other similarly substituted benzoate compounds such as the hydroxybenzoate and hydroxycinnamate compound families In addition, carboxylate salts of ammonium and the various amine functional groups described above ranging from about 1 to 20 carbon atoms and desirably from about 3 to about 15 carbon atoms and preferably from about 5 to about 12 carbon atoms are also included. Desired examples include ammonium acetate, morpholine octanoate, cyclohexylamine benzoate, and dicyclohexylamine octanoate. The linear response of the preferred analytical reagent to solutions of these various carboxylate corrosion inhibitors is demonstrated in FIG. 3, where mixtures of the reagent with sodium octanoate (alkyl carboxylate) and sodium benzoate (benzoate) generate solutions that absorb 700 nm light in an octanoate ($R^2$=0.99) and benzoate ($R^2$=0.99) concentration-dependent manner.

Various inorganic and organic phosphate compounds also form colored complexes with the preferred embodiment of the analytical reagent. This includes numerous alkali metal and alkaline earth metal phosphate salts, as well as those of ammonium, in their various basic forms, such as the mono-, di-, and tribasic phosphate salts of sodium, potassium, magnesium, calcium, and ammonium. In addition, various organic phosphate chemistries comprising alkyl and aryl structures that number about 2 to 20 carbon atoms and desirably from about 3 to about 15 carbon atoms and preferably from about 4 to about 12 carbon atoms as well as one or more phosphate functional groups are also included. Notable examples include monoalkyl, dialkyl, and cyclo phosphate esters such as ethanol 2-(2-butoxyethoxy)-phosphate potassium salt, mono-n-octyl phosphate ester, bis(2-ethylhexyl) phosphate, sodium dioctyl phosphate, and the alkali metal and alkaline earth-metal salts of phytic acid. Please see U.S. Pat. No. 5,611,992A, hereby fully incorporated by reference. The linear response of the analytical reagent to solutions of these compounds is illustrated in FIG. 3 where increasing concentrations of the phosphate ester ethanol 2-(2-butoxyethoxy)-phosphate potassium salt react with the reagent to generate solutions that absorb 700 nm light in a concentration-dependent manner ($R^2$=1.00).

1,3-diketones are yet another class of corrosion inhibitor compounds that react with the preferred embodiment of the analytical reagent to form colored complexes. Classically derived from the Claisen condensation reaction, these compounds range from about to 3 to 20 carbons in both alkyl and aryl configurations, and desirably from about 4 to about 15 carbon atoms and preferably from about 5 to about 12 carbon atoms and include examples such as acetylacetone and related fluorinated derivatives, as well as the 1,3-diketone malonates. The quantitative response of the analytical reagent to solutions of 1,3-diketones is demonstrated in FIG. 3 (diketone) where mixtures of the reagent with increasing concentrations of acetylacetone generated solutions that absorbed 400 nm light in a manner linear with acetylacetone concentration ($R^2=0.99$).

Figure 4:
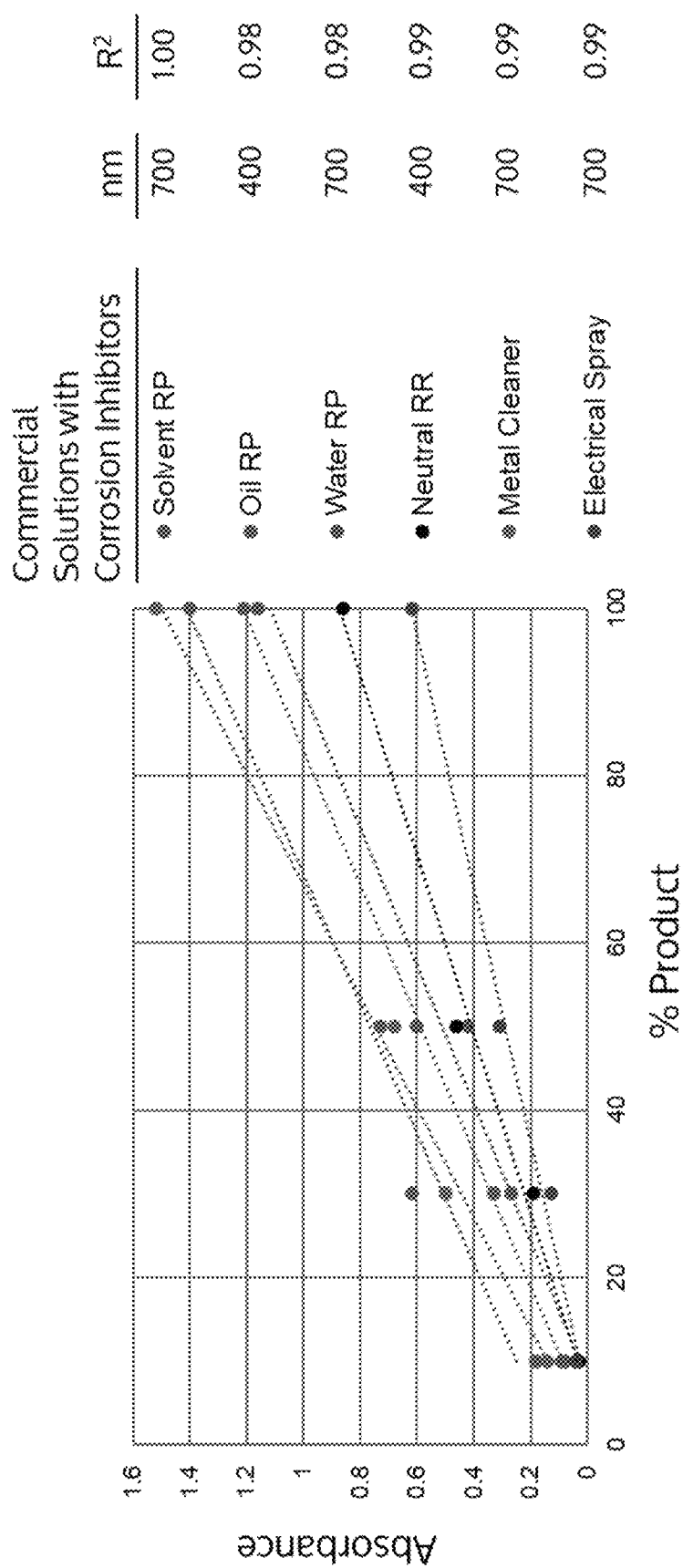
FIG. 4 shows a quantitative response, light absorption, of various commercial corrosion prevention and mitigation fluids after reaction with the transition metal-ligand reagent (preferred formula). UV-vis absorbance measurements (200-1100 nm) were collected at optimal wavelengths for each fluid as listed in the figure (nm). The "% product" along the horizontal axis of FIG. 4, refers to the concentration of the test solution where 100% represents the original strength as provided by the manufacturer. The remaining samples were prepared by diluting the original strength products with isopropyl alcohol to the concentration levels indicated in the graph. Importantly, the volumetric ratio of analytical reagent to sample was held constant for all reactions, regardless of sample concentration. This description is true also for FIG. 5. The linearity of the response for each compound is reflected by the Coefficient of determination ($R^2$) value where 1.00 is ideal. Rust preventative (RP), Rust Remover (RR).
Figure 5:
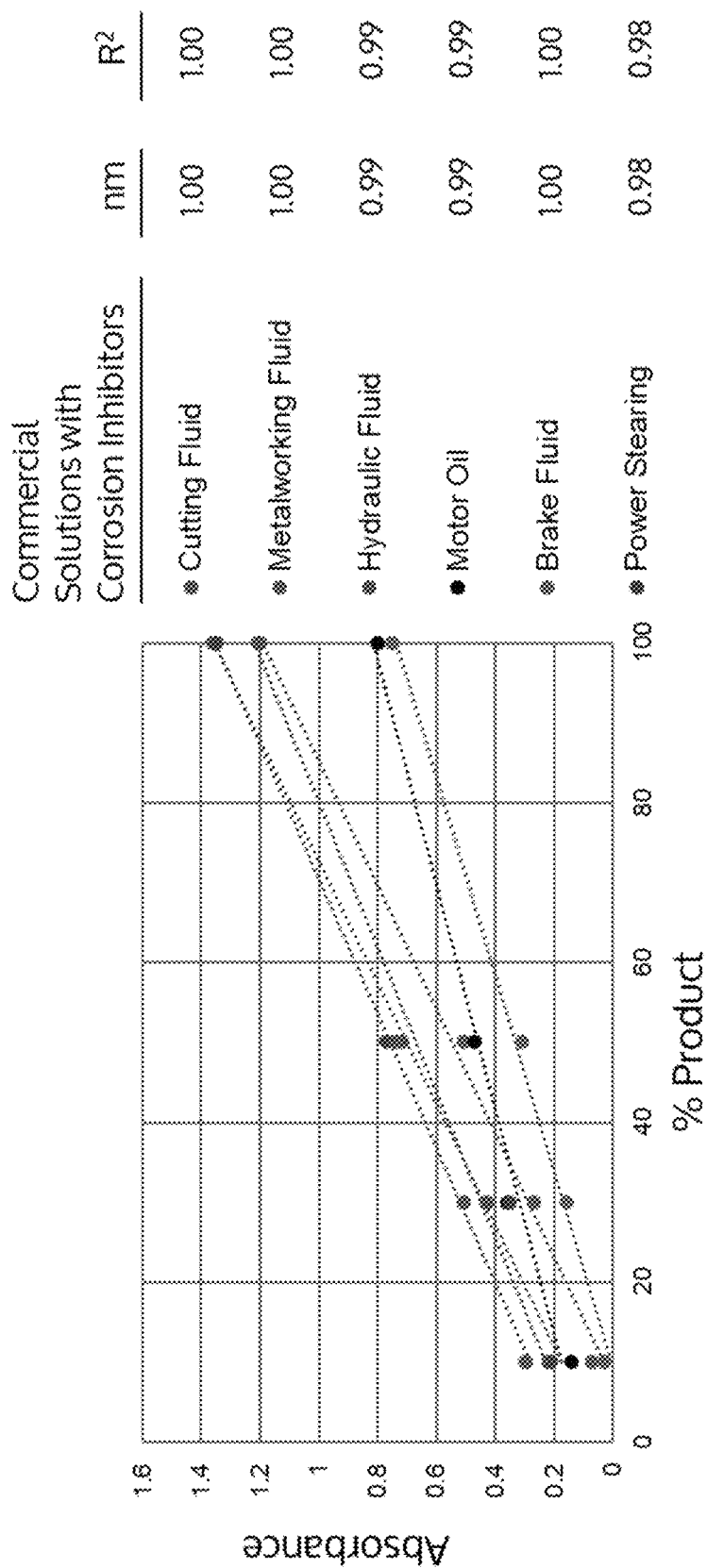
FIG. 5 is similar to FIG. 4 except that it relates to different types of fluids such as a Cutting Fluid, a Hydraulic Fluid, or a Brake Fluid, etc., and shows a quantitative response of various commercial metal lubrication fluids containing corrosion inhibitors (not listed) following their reaction with the transition metal-ligand reagent (preferred formula). UV-vis absorbance measurements (200-1100 nm) were collected at optimal wavelengths for each fluid as listed in the figure (nm). The linearity of the response for each compound is reflected by the coefficient of determination ($R^2$) value where 1.00 is ideal.

In addition to standard corrosion inhibitor solutions, the analytical reagent also reacts quantitatively with various commercial fluids containing corrosion inhibition chemistries. As listed in Table 2, these fluids range in polarity from aqueous-based to solvent- and oil-based solutions, and include products for various applications. The linear response of the analytical reagent to some of these products is shown in FIG. 4, where mixtures of the preferred embodiment of the analytical reagent with commercial rust preventatives (RP), rust removers (RR), metal cleaner, and electrical spray fluids absorbed light at optimal wavelengths in a manner dependent on the strength of the fluid tested. Similar quantitative results were also shown for other corrosion inhibitor containing commercial fluids, where anti-corrosive properties are not the primary function, such as cutting fluids, metal working fluids, hydraultic fluids, motor oil, brake fluid, and power steering fluids (FIG. 5). In each situation, the linearity of the correlation between absorbance and fluid concentration is well reflected by the high correlation determinate ($R^2$) values for each fluid. These data demonstrate the broad applicability of the analytical reagent for measuring corrosion inhibitor concentration in real-world fluids of varying formulation complexities.

TABLE 2

Applicable Range of Fluid Polarities

| Water-Based | Solvent-Based | Oill-Based |
|---|---|---|
| Acid/Alkaline Cleaners | Rust Preventatives (RPs) | Rust Preventatives (RPs) |
| Aqueous Rust Removers | Electrical Sprays | Engine Oil |
| Metal-cutting Fluids | | Hydraultic Fluid |
| Rust Preventative (RPs) | | |

Figure 6:
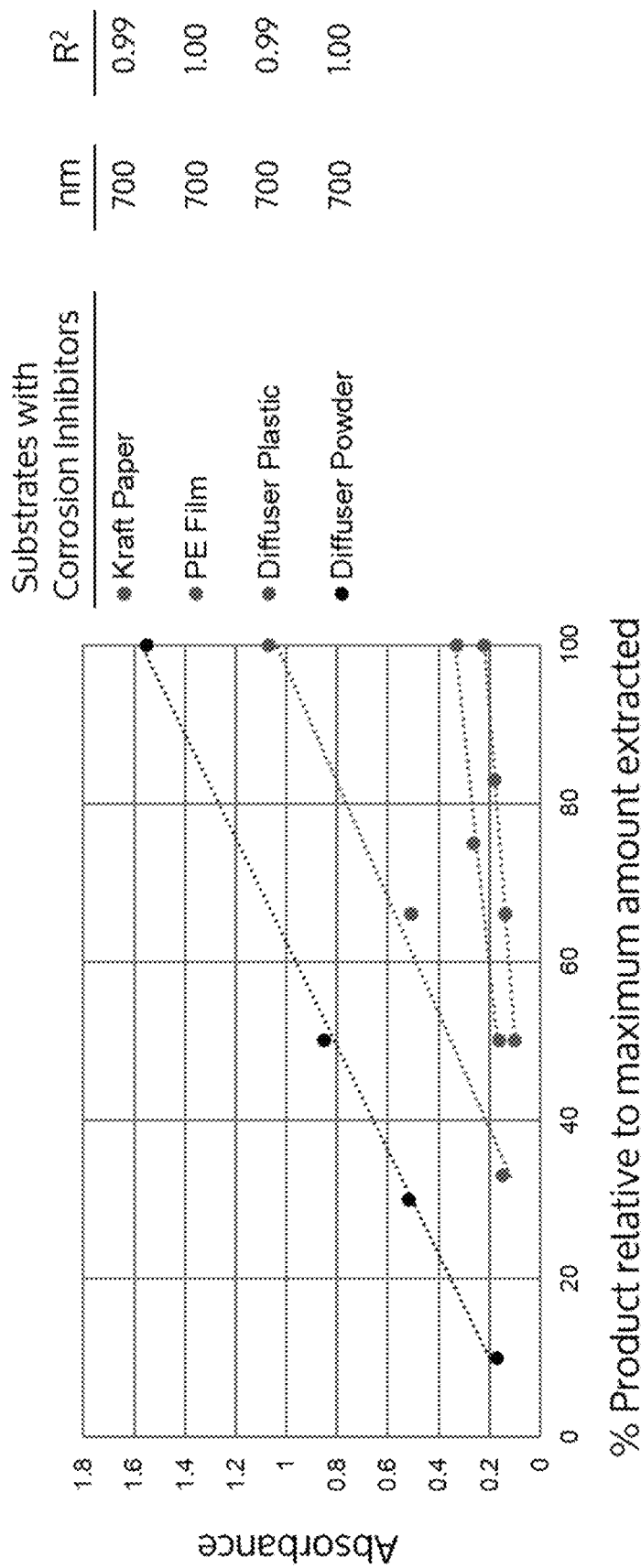
FIG. 6 is similar to FIGS. 4 and 5 and shows a quantitative response, light absorption, from reacting the transition metal-ligand reagent (preferred formula) with solvent extracts from various packaging materials containing corrosion inhibitors. UV-vis absorbance measurements (200-1100 nm) were collected at optimal wavelengths for each fluid as listed in the figure (nm). The linearity of the response for each compound is reflected by the coefficient of determination ($R^2$) value where 1.00 is ideal. polyethylene (PE).

In addition to designed corrosion inhibitor fluids, the analytical reagent is also useful for measuring corrosion inhibitor concentrations in the liquid extracts of commercial solid substrates, more specifically those used in the packaging and preservation of metal parts. For example, aqueous extracts prepared from increasing amounts of four different corrosion mitigating substrates (paper, flexible film, solid plastic, powder) were mixed with the preferred embodiment of the analytical reagent (FIG. 6). In each case, the amount of light absorbed at 700 nm correlated linearly to the amount of substrate in the extraction ($R^2 \geq 20.99$). Table 3 lists additional examples of select packaging materials from which corrosion inhibitors are extractable into solutions and measurable by the analytical reagent. Broad examples thereof have been set forth in the center column and specific examples in the right-hand column. Note: VCI refers to a class of corrosion inhibitors known as volatile corrosion inhibitors.

TABLE 3

Examples of Applicable Packaging Materials Containing Anti-corrosive chemistries

| Article Type | Example (broad) | Example (specific) |
|---|---|---|
| Plastic film | Polyethylene, polypropylene, etc. | VCI bags, sheets, tote, covers, etc. |
| Hard plastic | Polycarbonate, polystearate, polyvinylchloride, etc. | VCI diffusers |
| Paper | Kraft, envelopes, poly coated | VCI paper |
| Powder | Diffusable foggable liquid additives | VCI diffusers, VCI fogs, anti-corrosion additive packages |

The analytical reagent's solvent system is critical to its performance as it balances the solubility requirements of the reagent-ligands with the miscibility limitations of the solvent and oil-based samples to be tested. In this case, dissolution of the metal-ligands can be achieved using any one or a combination of various primary solvents, such as water, methanol, and the polar aprotic solvents of dimethylsulfoxide (DMSO) and dimethylformamide (DMF). To increase solubility of the metal-ligands in the polar aprotic solvents, small amounts of concentrated inorganic or organic acids, such as sulfuric, nitric, or acetic acid may be added. The amount thereof is 0 to 20,000 parts per million (ppm) by weight; desirably between 100 to 10,000 ppm weight, and preferably from 500 to about 2,000 ppm by weight.

Additional co-solvents designed to stabilize newly formed metal-inhibitor complexes may also be desirable. Examples of such secondary solvents include one or more linear and cyclic, short to long chain organic acids ranging from 3 to about 36 carbon atoms and desirably from about 4 to about 24 and preferably from about 6 to about 18. Specific examples include propanoic acid, octanoic acid, nonanoic acid, stearic acid, C18 dimer acid, salicylic acid and the like. Notably, these co-solvents offer the added benefit of intensifying the color change of the reagent when it is reacted with sample fluids.

To further extend miscibility with oil-based products and to further enhance stability of newly formed metal-ligand complexes, a tertiary solvent may also be used. Examples of such solvents include C1-C16 alcohols, such as methanol, isopropanol, hexanol, dodecanol, and hexadecanol. This range can be extended if the reagent is used at temperatures higher than 25° C.

To provide miscibility with the broadest range of sample polarities the relative ratio of solvents comprising the reagent can be adjusted. For example, reducing or even eliminating the secondary and/or tertiary co-solvents will increase miscibility with water-based fluids. Conversely, increasing the amount of these co-solvents promotes greater miscibility with the solvents and oil-based fluids.

The solvent composition may also be adjusted to meet the stability requirements of the complex formed between the reagent metal salt and the corrosion inhibitor within the fluid being tested. While reducing the levels of secondary and tertiary co-solvents promote greater stability of complexes involving polar inhibitors such as EDTA, increasing them enhances the stability of complexes formed with more non-polar inhibitors such as octanoate.

While the transition metal-ligand complex can be added to a corrosion inhibitor containing fluid and is preferred, the corrosion inhibitor containing fluid can be added to the transition metal-ligand complex, i.e. the analytical reagent solution. In either event, the amount of the transition metal-ligand complex in the analytical reagent solvent is very small, and can vary from about 0.05 wt. % to about 5.0 wt. %, desirably from about 0.1 wt. % to about 2.0 wt. %, and preferably from about 0.1 wt. % to about 0.5 wt. %. The amount of the primary solvent such as DMSO, methanol, or water, or any combination thereof, can vary widely such as from about 20 wt. % to about 80 wt. % or 90 wt. %, desirably from about 30 wt. % to about 70 wt. % and preferably from about 40 wt. % to about 60 wt. %. The amount of the secondary organic acid solvent, such as a nonanoic acid, can vary from about 5 wt. % to about 70 wt. % by weight, desirably from about 10 wt. % to about 50 wt. %, and preferably from about 20 wt. % to about 40 wt. %. The amount of any tertiary solvent, such as decanol, can vary from about 2 wt. % to about 40 wt. %, desirably from about 5 wt. % to about 30 wt. %, and desirably from about 10 wt. % to about 20 wt. %.

While numerous combinations of the above set forth compounds of ranges will produce considerable color change, currently the most preferred formula is as follows:

| Formulation A | | |
| --- | --- | --- |
| Ingredient | Preferred Wt. % | Typical Range of Wt. % |
| Copper Suifate Pentahydrate ($CuSO_4 \times 5H_2O$) | 0.4 | 0.2-0.5 |
| Sulfuric Acid (98%) | 0.1 | 0.05-2.0 |
| Dimethylsulfoxide (DMSO) | 54 | 40-60 |
| Hexanol | 14 | 10-20 |
| Nonanoic Acid | 31.5 | 20-40 |

It is noted that the solubility of metal salts in DMSO increases with decreasing pH. With respect to the preferred metal salt $CuSO_4$, the solution loses color at low pH (<3) and requires more ligand to induce a detectable color change. As such, low pH, high % metal salt formulations could be made for the same applications as mild pH with lower % metal salts.

Another aspect or embodiment of the present invention is the utilization of a non-aqueous, absorbent substrate that can quantitatively and/or qualitatively detect various corrosion inhibitors within a fluid as noted above. The analytical reagent solution utilized to form the dry, detection substrate of the present invention is the same as set forth hereinabove and accordingly is hereby fully incorporated by reference with regard to all aspects thereof. The substrate is a solid, or semi-solid substrate that is stiff and/or pliable, is not a liquid, and is capable of containing the analytical reagent solution of the present invention thereon such as by absorption, and permitting the same be dried such that any solvent and/or aqueous content thereof is removed. Suitable examples of such absorbent substrates include various grades of paper including filter paper, Kraft paper, etc., cardboard, cloth including various fabrics that can be woven therefrom or another absorbent acceptable medium; and the like that are known to the art and to the literature, or any combination thereof. The term "absorbent acceptable medium" means any solid or semi-solid material into which a liquid reagent may be drawn into. Various different types of cloths can of course be made from natural sources such as hemp, wool, silk, cotton, flax, jute, or bamboo or from synthetic material such as polyester, nylon, polyolefin, polycarbonate, polystyrene, polyvinyl chloride, polyurethane, acrylic, rayon, and the like. These types as well as other types of absorbent materials can generally be in various different forms but the most conventional generally are absorbent pillows, absorbent pads, and also absorbent granuals, or any combination thereof, as well as reusable absorbent such as towels and rags.

A requirement of the substrate is that it be absorbent. By absorbent it is meant that the substrate is capable of absorbing anywhere from about 10, or about 30, or about 50% to about 500% or more of its mass in analytical solution prior to drying, desirably from about 30% to about 400%, and preferably from about 50% to about 300%.

The method of applying the analytical reagent solution to the substrate can be in accordance with any conventional method such as by spraying the solution thereon, coating, or dropping (i.e. small drops), or otherwise adding the analytical solution to the substrate. Alternatively, the paper, cardboard, or cloth, etc., can be dipped, submerged, etc., into the solution. The coated or impregnated substrate is then allowed to dry in any conventional manner such as by the application of heat, for example in an oven, by blowing a gas such as air thereon, or by letting the analytical reagent solution naturally dry on the substrate as by the Earth's atmosphere, i.e., air, etc. By the term "dried" it is meant that further drying does not reduce the weight of the substrate by more than 8%, desirably not more than 5%, and preferably not more than 3%. That is the substrate is at least about 92% dry desirably at least 95% dry and preferably at least 97% dry by weight.

Figure 7:
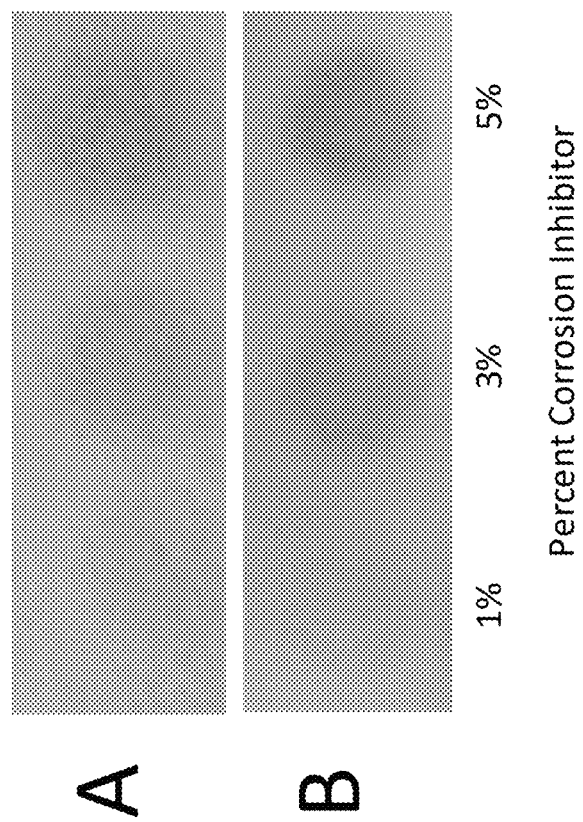
FIG. 7 shows a quantitative response, stain intensity, of corrosion inhibitor test papers to increasing concentrations of oleylamine. Test papers were prepared by saturating Whatman filter paper (#3) with either the preferred formulation described herein (A), or with a modified formulation where nonanoic acid was replaced with octanoic acid (B). After drying the papers overnight, 20 microliters of standard solutions containing at increasing concentrations of oleylamine were spotted and allowed to develop for 10 minutes.
Figure 8:
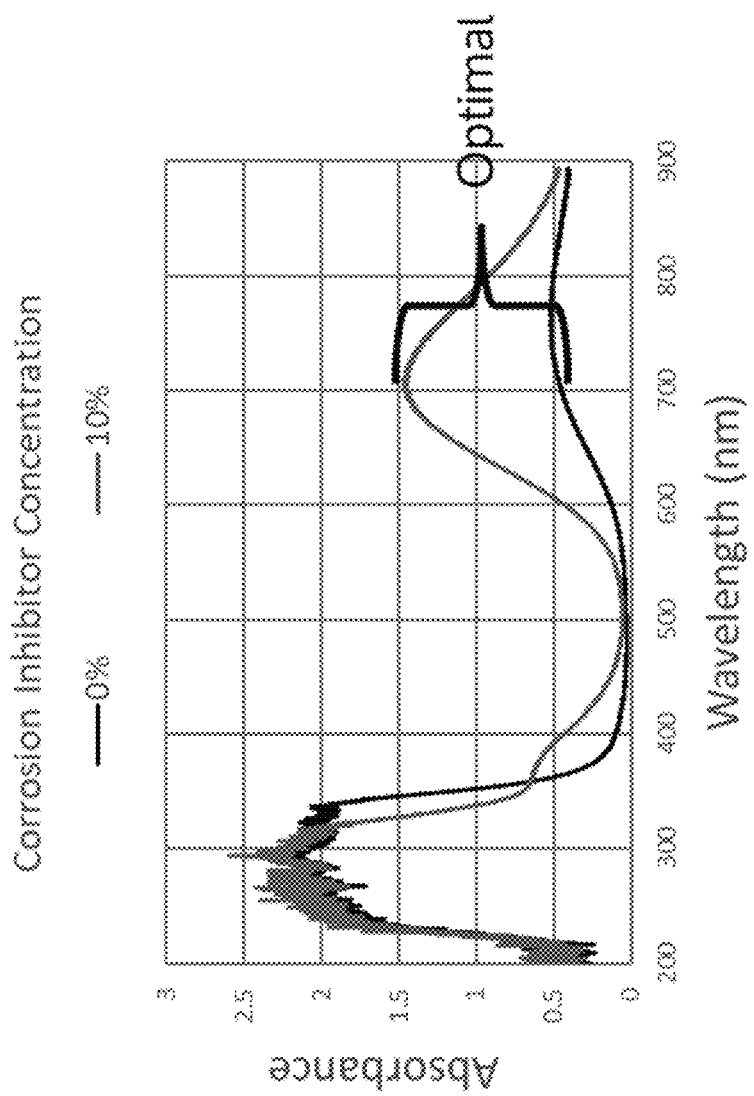
FIGS. 8-12 represent different steps in the Procedure Workflow for using the analytical reagent solution to measure the concentration of corrosion inhibitors in test solutions. Step 1) Determine the optimal absorbance wavelength for measuring corrosion inhibitor concentration in the test fluid of interest.
Figure 9:
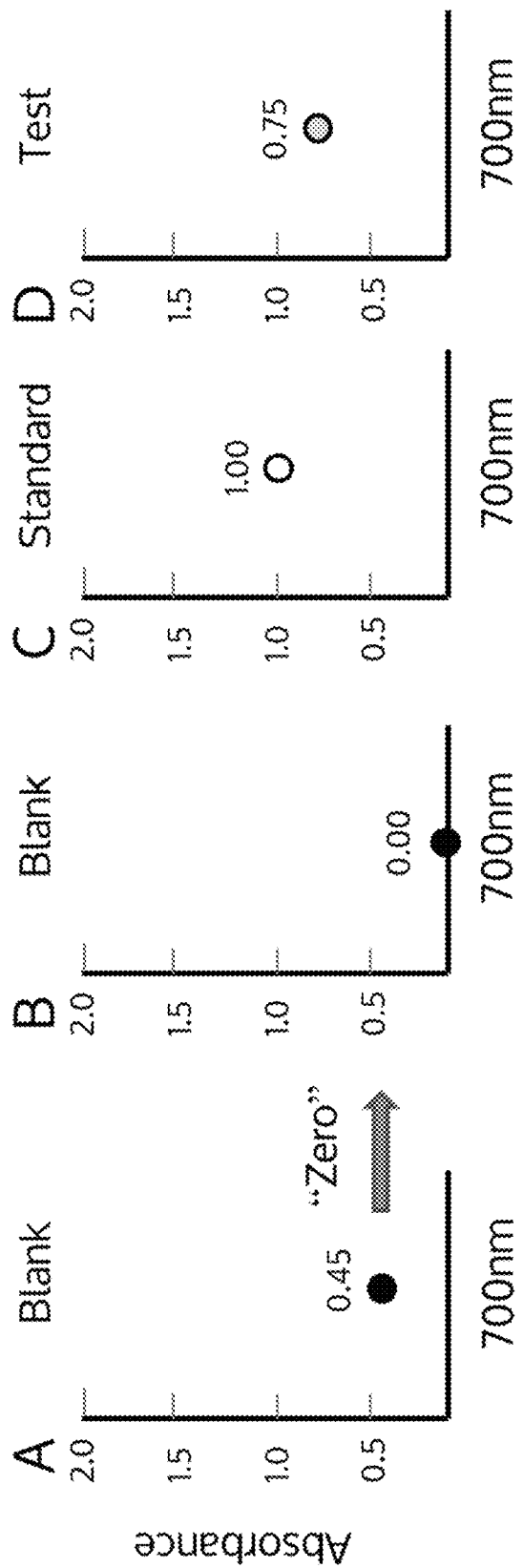

An important aspect of this embodiment is that the dried analytical reagent substrate, since it is not a liquid, need not be confined in a container, bottle, can, and the like, but can be readily carried and inserted into any type of corrosion inhibitor containing fluid as noted hereinabove, for example rust preventatives, metal cleaners, cutting fluids, engine oils, hydraulic fluids, antifreeze, metal protectorants, and the like. In addition, the same substrate may be inserted into liquid extractions of solid materials impregnated with corrosion inhibitors such as those listed hereinabove, including plastics, paper, scrim and powder. The shape of the substrate can vary widely and have different thicknesses but desirably is in the form of a sheet, that can be square, rectangular, circular, but preferably is a strip. A suitable size is from about 1 to about 3 inches long, from about ⅜ to about 1 inches wide, and has a thickness from about 0.005 to about 0.02 inches. Thus, the analytical reagent-substrates of the present invention are very convenient to use and exhibit the same properties as the analytical reagent solutions noted hereinabove. That is, such treated substrates can be readily inserted, much like a litmus strip, into a liquid containing one or more corrosion inhibitors and readily detect the existence of any concentrated corrosion inhibitors by the color change of the analytical reagent treated substrate. Alternatively, the fluid containing one or more corrosion inhibitors can be applied, as by dripping, dropping, spraying, etc., the corrosion inhibiting containing fluid onto the analytical reagent treated substrate such as shown in FIG. 7. In this procedure, the amount of metal-ligand complex in the analytical reagent solution is very small, as noted hereinabove, and hereby fully incorporated by reference. Examples of such corrosion inhibitors are set forth hereinabove and encompass compounds containing one or more heteroatoms of nitrogen, oxygen, sulfur, or phosphorous.

A noted advantage of the substrate containing the analytical reagent embodiment is that the intensity of the color change, which is proportional to the concentration of the corrosion inhibitor(s), can be readily detected by the human eye and does not require the use of an electromagnetic spectrograph as over a spectrum from about 200 to about 1,000 nanometers, to determine whether the amount of corrosion inhibitor in a particular fluid is of a sufficient, and/or desired amount. Rather in this embodiment, the color change produced by exposing the functionalized substrate to a test fluid is visually compared to one or more reference standards. Compared to the substrate alone, the resulting color change occurs within the wavelength range visible to the human eye, from about 380 to about 700 nm which of course include the colors of red, orange, yellow, green, blue, indigo, and violet. While the color change itself is dependent on the select transition-metal/corrosion inhibitor complex formed on the substrate, it is the intensity of the color change that correlates with corrosion inhibitor concentration. This is well illustrated in FIG. 7 where increasing concentrations of oleylamine solutions produced darker spots when dropped onto a paper substrate into which the analytical reagent was absorbed and dried. Thus, the quantitative response to corrosion inhibitor concentration by such substrates functionalized with the analytical reagent to corrosion inhibitor is similar to known substrates that also darken in color in response to the concentration of targeted compounds (ex. Nitrite test strips).

While the use of an absorbance substrate can be implemented the following two absorbance tests are preferred. These tests involve the detection of the amount of corrosion inhibitor in a fluid by utilizing one or more different types of UV-vis wavelength analyzers. Such analyzers are known to the literature and to the art and detect the amount of absorbed light at a specific wavelength (monochomator), or over a range of wavelengths (polychromator or scanning detector). Notable examples include spectrophotometers that measure either visible light alone, or a combination of UV and visible light (UV-vis). Manufacturers of such instruments, including Agilent, ThermoFisher, Shimadzu, Perkin Elmer, Jasco, Hach, and Mettler Toledo among others, produce various single-beam as well as multiple-beam models, all of which are suitable for measuring corrosion inhibitor induced color changes to the analytical reagent in the liquid phase. Such analyzers generally can detect wavelengths from about 200 to about 1100 nm, which extends slightly beyond the nanowavelength of visible light into the ultraviolet (UV) and infrared regions of the electromagnetic spectrum. Select examples of current model instruments include the Cary series from Agilent (Cary 60, Cary 3500, Cary 4000, Cary 5000, Cary 6000, Cary 7000), the Spectronic 200, Genesys 30, Genesys 40/50, Genesys 140/150, Genesys 180, Evolution 201/220, Evolution 260, Evolution 350, NanoDrop one/one, NanoDrop 8000, and the NanoDrop Lite from ThermoFisher, the UV-1280, BioSpec-Nano, UV-1900i, UV-2600i, UV-2700i, and the UV-3600i from Shimadzu, the Lambda series from Perkin Elmer (Bio, Bio+, XLS, XLS+, 850+, 1050+), the V series from Jasco (V-730, V-750, V-760, V-770, V-780, MV-3000), the DR series from Hach (DR1900, DR3900, DR6000), and the UV5, UV7, UV5BIO, and UV5NANO from Mettler-Toledo. Additional instruments widely used include the Agilent-HP 8453, the 721 and 752 (multiple manufacturers), the Varian Cary 50 and Cary 50B10, and the Lamda series of instruments from Perkin Elmer (Lamba 20, 25, 30, 35, and 40).

A general Workflow for combining the analytical reagent with spectrophotometric analysis to measure corrosion inhibitor concentration in solutions is provided herein, and is further illustrated in FIGS. 8-12. Initially, the optimal absorbance wavelength for measuring corrosion inhibitor concentration in the fluid of interest must be determined if not already known. This is most readily done using a polychromatic or scanning sprectrophotometer to measure absorbance changes across a broad range of wavelengths (ex. 200-900 nm) in response to increasing corrosion inhibitor concentration. Specifically, the absorbance spectrum for the analytical reagent mixed with fluids containing increasing concentrations of the corrosion inhibitor are measured and compared, typically by plotting the resulting spectra together on the same graph. The optimal wavelength is then determined by identifying on the graph where the greatest change in absorbance occurs in response to increasing corrosion inhibitor concentration. For example, in FIG. 8, combining the analytical reagent with standard solutions containing an increasing concentration of a fatty imidazoline corrosion inhibitor produced the greatest change in absorbance at 700 nm. With the optimal absorbance wavelength defined, all future concentration measurements for this corrosion inhibitor can be made using absorbance at this single wavelength.

Figure 10:
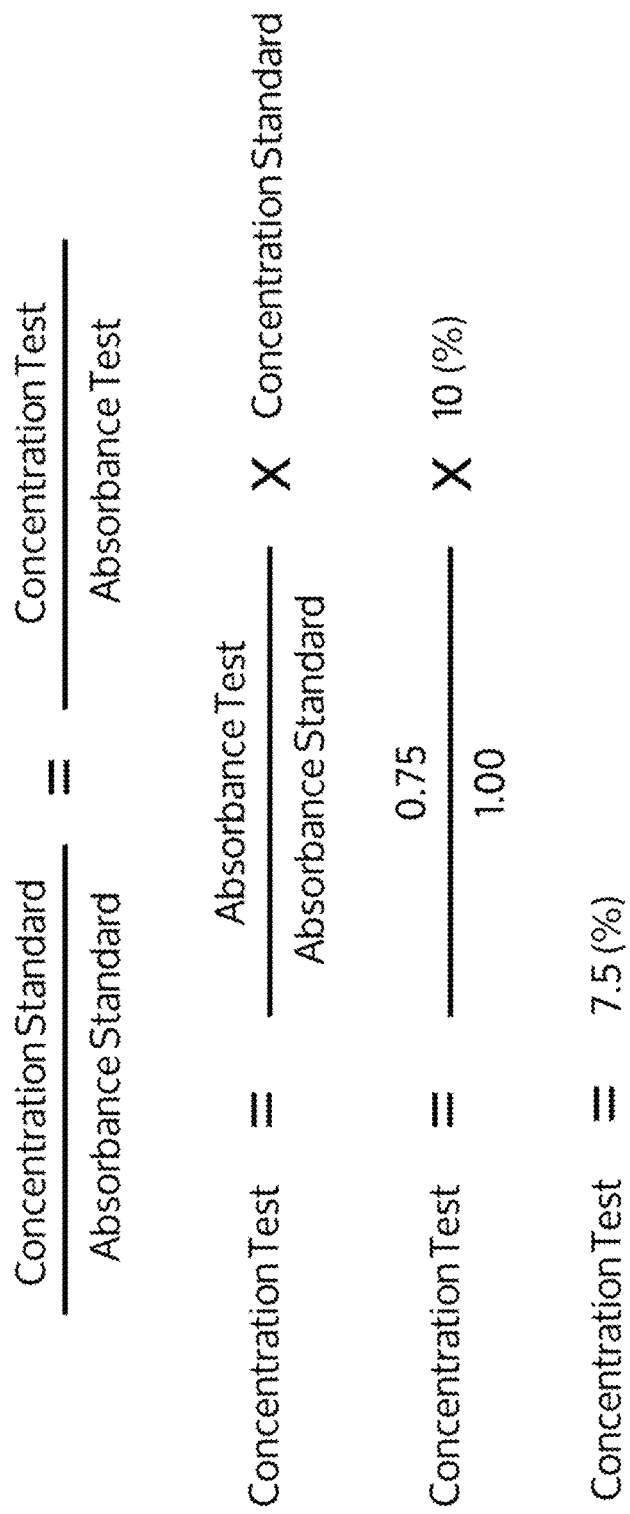
Figure 11:
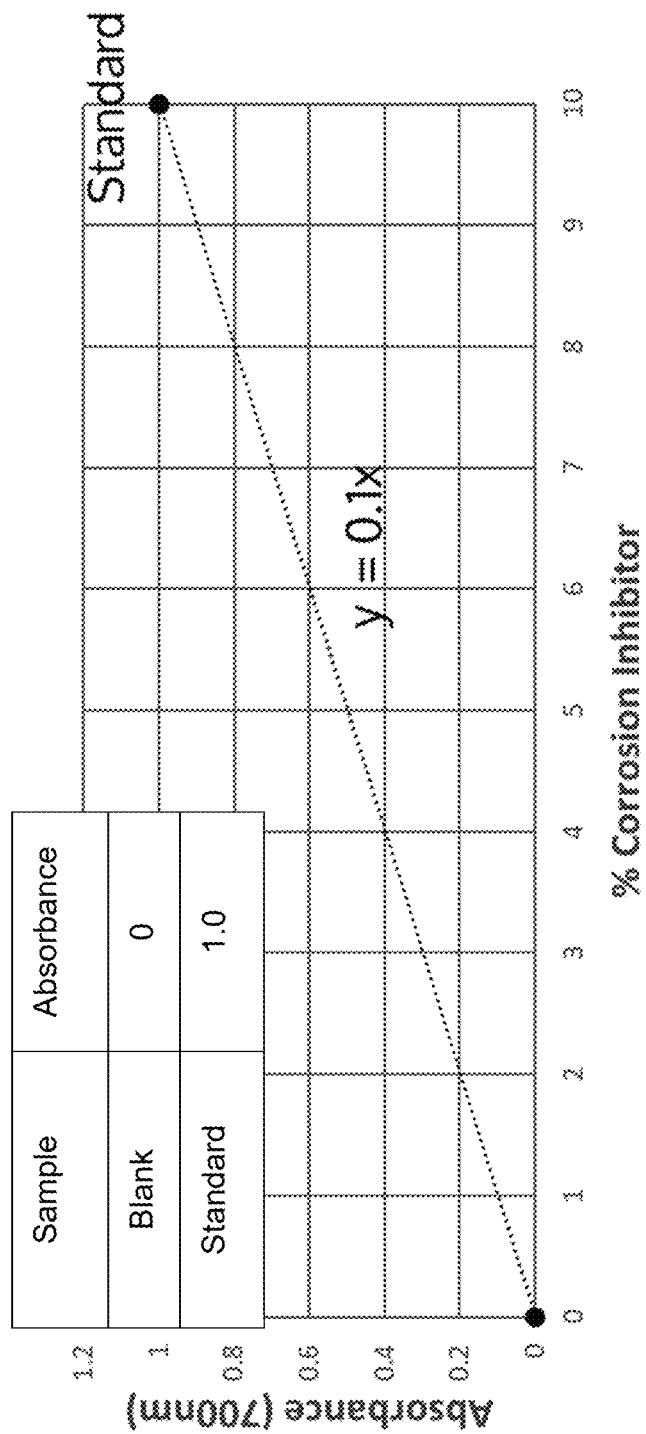
Figure 12:
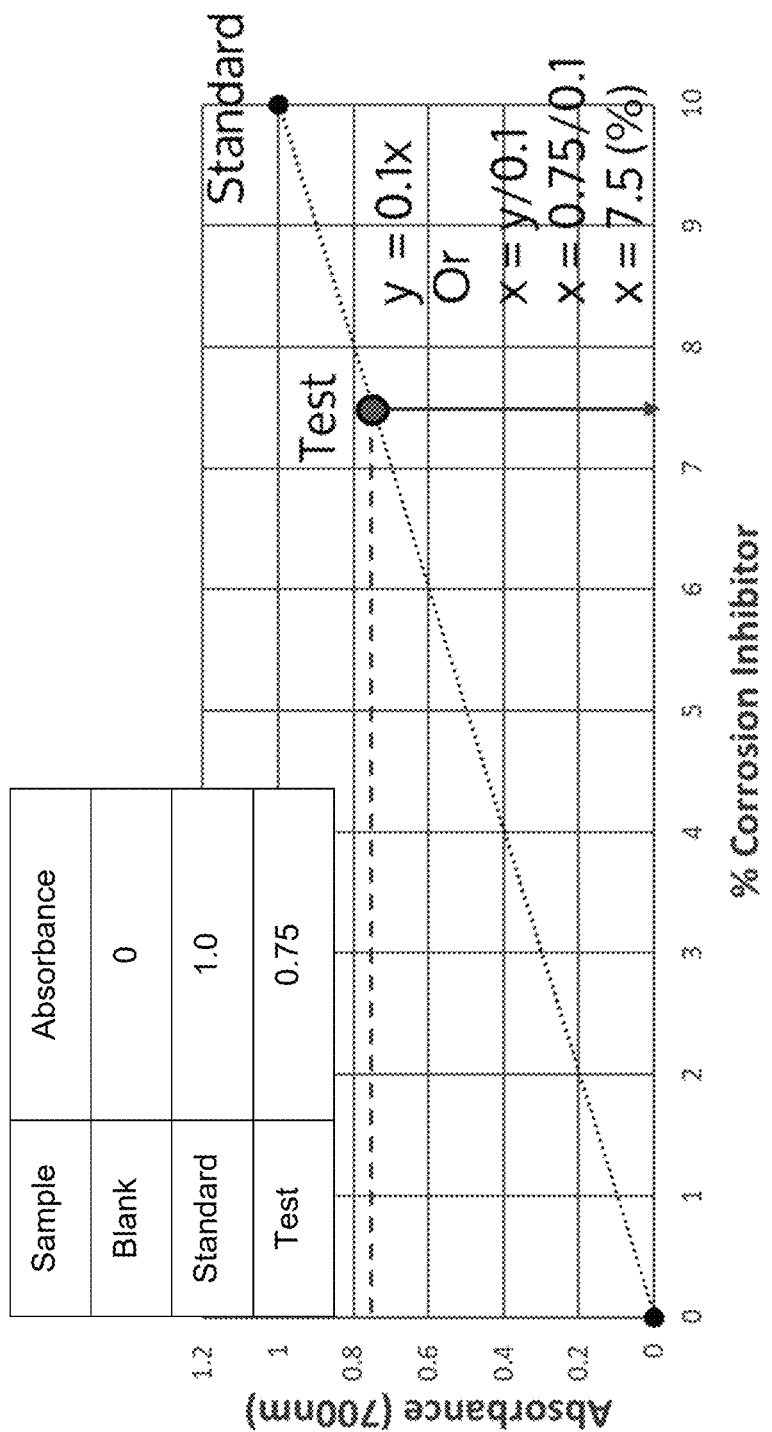

When the optimal wavelength for the analytical reagent/corrosion inhibitor complex is known, measuring the concentration of said corrosion inhibitor in a fluid is typically conducted as follows: 1) Set the spectrophotometer to the desired wavelength, in this case 700 nm, 2) Measure the absorbance of the "Control" sample, usually the analytical reagent alone or combined with a solution containing 0% of the corrosion inhibitor (FIG. 9A), 3) Define this value as the reference point for all future measurements by setting it to 0 ("Zero" or "Tare" the instrument, FIG. 9B), 4) Measure the absorbance of the analytical reagent after it has been combined with a Standard solution containing a known amount of the corrosion inhibitor. In this case, a mixture of the analytical reagent and a 10% solution of the fatty imidazoline inhibitor produced an absorbance of 1.00 (FIG. 9C), 5) Measure the absorbance of the analytical reagent after it has been combined with a Test sample containing the same corrosion inhibitor but at an unknown concentration. In this case, the fatty imidazoline Test fluid combined with the analytical reagent to produce an absorbance of 0.75 (FIG. 9D), 6) Calculate the corrosion inhibitor concentration in the Test sample via either proportional or linear regression analysis (FIGS. 10-12).

To calculate the concentration of the corrosion inhibitor in a test fluid using proportional analysis, substitute the values collected above into the below equation and solve (also see FIG. 10).

Test concentration=(Test absorbance/Standard absorbance)×Standard concentration

Using the example data for the fatty imidazoline corrosion inhibitor solutions:

Test concentration=(0.75/1.0)×10%=7.5%

To calculate the corrosion inhibitor concentration in a test fluid via linear regression analysis, do the following: 1) plot the absorbance measured above for the Standard solution on an absorbance vs. concentration graph (FIG. 11), 2) draw a line that connects this data point to the origin (0, 0), 3) define the equation of this line, which expresses the absorbance of the analytical reagent/inhibitor solution mixture ("y") as a function of the corrosion inhibitor concentration ("x") multiplied by the slope of the line, 4) substitute the absorbance measured for the Test sample above (0.75) into this equation and then solve for "x", the concentration of the corrosion inhibitor in the Test sample (FIG. 12).

Test absorbance(*y*)=Test concentration(*x*)×slope or

Test concentration(*x*)=Test absorbance(*y*)/slope

Using the example data for the fatty imidazoline corrosion inhibitor solutions:

$x = 0.75/0.1 = 7.5\%$

The benefit of the linear regression approach is that it is amenable to using multiple Standard solutions of varying corrosion inhibitor concentrations to better define the relationship between absorbance and corrosion inhibitor concentration. When multiple Standards are used, the absorbance for each is plotted on the same absorbance vs corrosion inhibitor concentration graph. Then, the line with the least amount of distance between it and the plotted data points is determined (best fit line) using linear regression analysis. The equation for this line, which defines both the slope and the y-intercept offset (relative to the origin), is determined and then rearranged to solve for corrosion inhibitor concentration. The resulting equation is represented below. Ultimately, the concentration of the Test sample above is then determined by substituting its measured absorbance value into the below equation.

Concentration=(Absorbance$\pm$y-intercept)/slope

While in accordance with the patent statutes, the best mode and preferred embodiments have been set forth, the scope of the invention is not limited thereto, but rather, by the scope of the attached claims.

What is claimed is:

1. A composition for the colorimetric quantification of a corrosion inhibitor in an industrial fluid, comprising:
an analytical reagent composition comprising a transition metal-ligand in a non-aqueous solution that when mixed with the industrial fluid containing the corrosion inhibitor, results in a mixed analytical reagent solution having an absorbance value that quantifies the amount of said corrosion inhibitor in said industrial fluid.

2. The composition according to claim 1, wherein a color change occurs in the mixed analytical reagent solution, wherein the color change is within wavelengths of from about 200 to about 900 nanometers, and wherein said corrosion inhibitor comprises one or more of an amine, a nitrite, a carbonate, a bicarbonate, a carboxylate, an aminopolycarboxylate, a phosphate, a thiazole, a thiadiazole,or a 1,3-diketone.

3. The composition according to claim 2, wherein said transition metal comprises iron, cobalt, or copper, and wherein said ligand comprises one or more of a sulfate, or a chlorine atom comprising Cl, $Cl_2$ or $Cl_3$, or any combination thereof.

4. The composition according to claim 3, wherein said transition metal-ligand comprises $CuSO_4$, CuCl, $CuCl_2$, $CoSO_4$, $CoCl_2$, $CoCl_3$, $FeSO_4$, $FeCl_2$, or $FeCl_3$, or any combination thereof.

5. The composition according to claim 4, wherein said transition metal-ligand comprises copper sulfate pentahydrate and said corrosion inhibitor comprises triethanolamine, octanoic acid, sodium nitrite, ammonium benzoate, alkyl imidazoline, or octylamine, or any combination thereof.

6. An analytical reagent solution for detecting corrosion inhibitors in an industrial fluid, comprising:
a transition metal-ligand in a non-aqueous solution that when mixed with the industrial fluid containing the corrosion inhibitors produces a color change, wherein said color change produces changes in the absorbance value of said analytical reagent solution measurable by routine spectrophotometric analysis in the range from 200 to 900 nanometers.

7. A process for the detection of an amount of a corrosion inhibitor in a fluid utilizing a wavelength analyzer; comprising the steps of:
determining the optimal wavelength between 200 and 900 nanometers for measuring corrosion inhibitor-dependent absorbance changes to the composition of claim 1 that comprises the analytical reagent composition by analyzing the absorbance spectra of said analytical reagent composition in the absence or presence of a corrosion inhibitor fluid;
setting said wavelength analyzer to the determined optimal wavelength;
analyzing said analytical reagent solution in the absence of corrosion inhibitor (Control) at said optimal wavelength;
setting the absorbance value of said Control analytical reagent solution at said optimal wavelength on said wavelength analyzer to zero;
combining said analytical reagent solution with a known amount of a solution comprising said corrosion inhibitor to form a "Standard" analytical reagent-corrosion inhibitor solution;
determining an absorption value of said "Standard" analytical reagent-corrosion inhibitor solution at said optimal wavelength;
analyzing the absorption value of a further different solution ("Test" sample) comprising said analytical reagent with a fluid containing an unknown amount of the same type of said corrosion inhibitor; and
comparing the absorption value of said further solution containing said unknown amount of said corrosion inhibitor with the absorption value of said "Standard" solution having a known amount of corrosion inhibitor therein, and wherein the amount of said unknown corrosion inhibitor in said further analytical reagent solution is the percent of the absorption value of said unknown further corrosion inhibitor solution as compared to the absorption value of said "Standard" solution having said known amount of corrosion inhibitor therein multiplied by the amount of corrosion inhibitor in said "Standard" transition metal-ligand inhibitor solution.

8. The process according to claim 7, wherein said transition metal comprises iron, cobalt, or copper, and wherein said ligand comprises one or more of a sulfate, or a chlorine atom comprising Cl, $Cl_2$ or $Cl_3$, or any combination of said transition metal and said ligand.

9. The process according to claim 7, wherein said transition metal-ligand comprises $CuSO_4$, CuCl, $CuCl_2$, $CoSO_4$, $CoCl_2$, $CoCl_3$, $FeSO_4$, $FeCl_2$, or $FeCl_3$, or any hydrates thereof, or any combination thereof.

10. The process according to claim 9, wherein said corrosion inhibitor comprises one or more of an amine, a nitrite, a carbonate, a carboxylate, an aminopolycarboxylate, a phosphate, a thiazole, a thiadiazole, or a 1,3-diketone, or any combination thereof.

11. The process according to claim 9, wherein said corrosion inhibitor comprises said amine, wherein said amine contains from about 3 to about 15 carbon atoms, wherein said nitrite compound comprises an alkali metal or an alkaline earth metal nitrite salt, or a carbonate or a bicarbonate, or a carboxylate salt having from about 3 to 20 carbon atoms and includes an alkali metal or an alkaline earth metal salt, or an aminopolycarboxylate having from about 2 to about 30 carbon atoms, or a thiazole or a thiadiazole having from 3 to about 20 carbon atoms, or an inorganic phosphate, or an alkali metal or an alkaline earth metal phosphate salt having from 2 to 20 carbon atoms, or a 1,3-diketone having from 3 to 20 carbon atoms and is an alkyl or an aryl 1,3-diketone.

12. The process according to claim 11, wherein said amine comprises triethanolamine, octylamine and morpholine.

13. The process according to claim 11, wherein said transition metal comprises copper sulfate pentahydrate.

14. A process for the detection of an amount of a corrosion inhibitor in a fluid utilizing a wavelength analyzer; comprising the steps of:
- determining the optimal wavelength between 200 and 900 nanometers for measuring corrosion inhibitor-dependent absorbance changes to the composition of claim 1 that comprises the analytical reagent composition by analyzing the absorbance spectra of said analytical reagent composition in the absence or presence of a corrosion inhibitor fluid;
- setting said wavelength analyzer to the determined optimal wavelength;
- analyzing said analytical reagent solution in the absence of corrosion inhibitor (Control) at said optimal wavelength;
- setting the absorbance value of said Control analytical reagent solution at said optimal wavelength on said wavelength analyzer to zero;
- combining said analytical reagent solution with a known amount of a solution comprising said corrosion inhibitor to form a "Standard" analytical reagent-corrosion inhibitor solution;
- determining an absorption value of said "Standard" analytical reagent-corrosion inhibitor solution at said optimal wavelength, and placing said absorbance value at a point on a plot of an absorption value (vertical axis) versus the weight percent of said corrosion inhibitor (horizontal axis) in said fluid;
- drawing essentially a straight line from said absorbance value point of said "Standard" analytical reagent-corrosion inhibitor solution on said plot to the origin at 0 absorbance and 0% corrosion inhibitor on said plot;
- analyzing the absorption value of a further different solution ("Test" sample) comprising said analytical reagent with a fluid containing an unknown amount of the same type of said corrosion inhibitor, and placing the absorbance value thereof as a point on said line of said plot; and
- wherein the value directly vertically below said absorbance value of said further solution on said straight line is the amount of corrosion inhibitor in said further different solution.

15. The process according to claim 14, wherein said transition metal comprises iron, cobalt, or copper, and wherein said ligand comprises one or more of a sulfate, or a chlorine atom comprising Cl, $Cl_2$ or $Cl_3$, or any combination of said transition metal and said ligand.

16. The process according to claim 14, wherein said transition metal-ligand comprises $CuSO_4$, CuCl, $CuCl_2$, $CoSO_4$, $CoCl_2$, $CoCl_3$, $FeSO_4$, $FeCl_2$, or $FeCl_3$, or any hydrates thereof, or any combination thereof.

17. The process according to claim 16, wherein said corrosion inhibitor comprises one or more of an amine, a nitrite, a carbonate, a carboxylate, an aminopolycarboxylate, a phosphate, a thiazole, a thiadiazole,or a 1,3-diketone, or any combination thereof.

18. The process according to claim 16, wherein said corrosion inhibitor comprises said amine, wherein said amine contains from about 3 to about 15 carbon atoms, wherein said nitrite compound comprises an alkali metal or an alkaline earth metal nitrite salt, or a carbonate or a bicarbonate, or a carboxylate salt having from about 3 to 20 carbon atoms and includes an alkali metal or an alkaline earth metal salt, or an aminopolycarboxylate having from about 2 to about 30 carbon atoms, or a thiazole or a thiadiazole having from 2 to about 20 carbon atoms, or an inorganic phosphate, or an alkali metal or an alkaline earth metal phosphate salt having from 2 to 20 carbon atoms, or a 1,3-diketone having from 3 to 20 carbon atoms and is an alkyl or an aryl 1,3-diketone.

19. The process according to claim 18, wherein said amine comprises triethanolamine, octylamine and morpholine.

20. The process according to claim 18, wherein said transition metal comprises copper sulfate pentahydrate.

\* \* \* \* \*